United States Patent
Edanami

(10) Patent No.: US 8,269,888 B2
(45) Date of Patent: Sep. 18, 2012

(54) IMAGE PROCESSING APPARATUS, IMAGE PROCESSING METHOD, AND COMPUTER READABLE MEDIUM HAVING IMAGE PROCESSING PROGRAM

(75) Inventor: Ikumi Edanami, Yokohama (JP)

(73) Assignee: Fujitsu Limited, Kawasaki (JP)

(*) Notice: Subject to any disclaimer, the term of this patent is extended or adjusted under 35 U.S.C. 154(b) by 1310 days.

(21) Appl. No.: 11/907,267

(22) Filed: Oct. 10, 2007

(65) Prior Publication Data

US 2008/0165276 A1    Jul. 10, 2008

(30) Foreign Application Priority Data

Oct. 11, 2006  (JP) ................................ 2006-277510

(51) Int. Cl.
*H04N 7/01* (2006.01)
(52) U.S. Cl. ...................................... 348/448
(58) Field of Classification Search .................. 348/447, 348/448, 452, 458, 459, 554–556, 558, 497, 348/607, 701; 375/240.16, 240.17, 240.26, 375/240.29; 382/107
See application file for complete search history.

(56) References Cited

U.S. PATENT DOCUMENTS
6,697,431 B1    2/2004    Yoneyama

FOREIGN PATENT DOCUMENTS
| JP | 6-233255 | 8/1994 |
|---|---|---|
| JP | 10-98692 | 4/1998 |
| JP | 2000-350212 | 12/2000 |
| JP | 2002-185933 | 6/2002 |
| JP | 2005-260309 | 9/2005 |

*Primary Examiner* — Vivek Srivastava
*Assistant Examiner* — Aklil Tesfaye
(74) *Attorney, Agent, or Firm* — Staas & Halsey LLP

(57) ABSTRACT

An IP conversion unit 20 converts an interlaced image which is an input image into a progressive (non-interlaced) image, and outputs the image. A scene detection unit 30 detects from motion vectors (Mx, My) whether the entire image is being slowly vertically scrolled (outputs a vertical scrolling coefficient tcoef). In a 3D filter 41 of an interlace interference removal unit 40, when vertical scrolling is detected, parallel motion of a plurality of past output images according to an average motion amount is caused according to motion vectors (Mx, My), cumulative pixel values are calculated, and the pixel values are taken to be the output image during vertical scrolling (interpolated image).

16 Claims, 6 Drawing Sheets

EXAMPLE OF DIVISION REGIONS

EXAMPLE OF DIVISION REGIONS

FLOW OF PROCESSING IN SCENE DETECTION PROCESSING UNIT

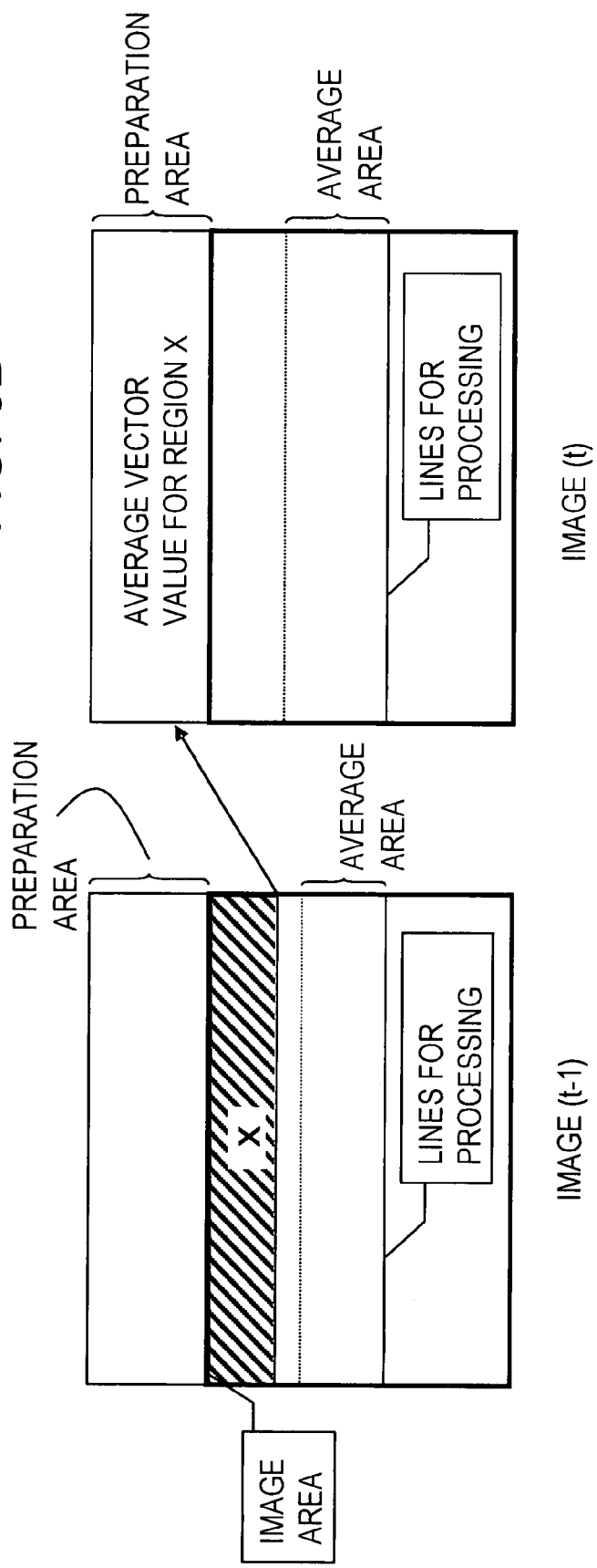

IP CONVERTED IMAGE OF
THE PRIOR ART

ADVANTAGEOUS RESULT OF
IP CONVERSION BY
THIS EMBODIMENT

IMAGE PROCESSING APPARATUS, IMAGE PROCESSING METHOD, AND COMPUTER READABLE MEDIUM HAVING IMAGE PROCESSING PROGRAM

CROSS-REFERENCE TO RELATED APPLICATIONS

This application is based upon and claims the benefit of priority from the prior Japanese Patent Application No. 2006-277510, filed on Oct. 11, 2006, the entire contents of which are incorporated herein by reference.

BACKGROUND OF THE INVENTION

1. Field of the Invention

This invention relates to an image processing apparatus which converts an interlaced image into a progressive image (performs IP conversion), an image processing method, and a computer readable medium having an image processing program. More specifically, this invention relates to an image processing apparatus which, in IP conversion, reduces or removes interlace interference which occurs during slow vertical scrolling, an image processing method, and a computer readable medium having an image processing program.

2. Description of the Related Art

In the past, when displaying moving images on a liquid crystal display, plasma display or similar, interlaced images have been converted into progressive (non-interlaced) images (IP conversion).

However, when generating progressive images, there has been the problem that during slow vertical scrolling, so-called interlace interference (a sensation of flicker) occurs. For example, two blurred horizontal lines (edges) and one edge are generated periodically in a progressive image for one edge in the original image, and consequently interlace interference, with local fluctuation in the output image, occurs.

In order to reduce this interlace interference, in the prior art a video signal decoding apparatus has been disclosed in which frame or field processing judgment unit are used to judge whether, in a variable-length decoding unit, decoded data is frame-processed or field-processed in each macro block; if field-processed, an interpolation unit are used to create frame data (Japanese Patent Laid-open No. 2000-350212).

However, the apparatus disclosed in Japanese Patent Laid-open No. 2000-350212 alleviates interlace interference from an image within a single field. Hence when for example an image is slowly scrolled vertically, there is almost no advantageous result with respect to the large interlace interference which occurs at nearly-horizontal edge portions.

This is because, although horizontal lines move in the vertical direction during vertical scrolling, there are cases in which the motion vector is detected in the horizontal direction, and even when interpolation is used to generate a progressive image, because this is based on a direction which is not the scrolling direction (where interpolation in the vertical direction should be performed, interpolation is instead in the horizontal direction detected as the motion vector), interlace interference cannot be removed.

SUMMARY OF THE INVENTION

With the foregoing in view, it is an object of the present invention to provide an image processing apparatus which reduces or removes interlace interference arising when an image with a large number of horizontal lines in particular is scrolled slowly in the vertical direction, an image processing method, and a computer readable medium having an image processing program.

To achieve the object, one embodiment of the present invention is an image processing apparatus having an IP conversion unit which converts an input interlaced image into a progressive image; a scene detection unit which detects whether the interlaced image is a slowly vertically scrolled image or not; and a filter processing unit which, if the slowly vertically scrolled image is detected by the detection unit, calculates average motion amounts according to the speed of vertical scrolling of the interlaced image, causes parallel motion of each of output images of a plurality of past frames according to the average motion amounts, calculates cumulative pixel values from output images of the plurality of past frames after parallel motion and the progressive image, and outputs the pixel values as a current output image.

Further, to achieve the object, another embodiment of the present invention is an image processing apparatus having an IP conversion unit which converts an input interlaced image into a progressive image; a scene detection unit which detects whether the interlaced image is a slowly vertically scrolled image or not; and a filter processing unit which, if the slowly vertical scrolled image is detected by the detection unit, calculates an average motion amount according to the speed of vertical scrolling of the interlaced image, causes parallel motion of an immediately preceding output image according to the average motion amount, calculates cumulative pixel values from the immediately preceding output image after parallel motion and the progressive image as a recursive filter in a time direction, and outputs the pixel values as a current output image.

Further, to achieve the object, another embodiment of the present invention is an image processing method in an image processing apparatus, having the steps of converting an input interlaced image into a progressive image by a conversion unit; detecting that the interlaced image is a slowly vertically scrolled image or not; and calculating average motion amounts according to the speed of vertical scrolling of the interlaced image, causing parallel motion of each of output images of a plurality of past frames according to the average movement amounts, calculating cumulative pixel values using the output images of the plurality of past frames after parallel motion and the progressive image, and outputting the pixel values as a current output image, on detection of the slowly vertically scrolled image.

Further, to achieve the object, another embodiment of the present invention is an image processing method in an image processing apparatus, having the steps of converting an input interlaced image into a progressive image by a conversion unit; detecting that the interlaced image is a slowly vertically scrolled image or not; and calculating average motion amounts according to the speed of vertical scrolling of the interlaced image, causing parallel motion of an immediately preceding output image according to the average motion amount, calculating cumulative pixel values using the immediately preceding output image after parallel motion and the progressive image as a recursive filter in a time direction, and outputting the pixel values as a current output image, upon detection of the slowly vertically scrolled image.

Further, to achieve the object, another embodiment of the present invention is a computer readable medium having an image processing program causing an image processing apparatus to execute an image processing, having a conversion processing which converts an input interlaced image into a progressive image; a detection processing which detects whether the interlaced image is a slowly vertically scrolled image or not; and an filter processing which, upon detection of the slowly vertically scrolled image, calculates average motion amounts according to the speed of vertical scrolling of the interlaced image, causes parallel motion of each of output images of a plurality of past frames respectively stored in a plurality of memory units according to the average movement amounts when reading out the output images of the plurality of past frames, calculates cumulative pixel values using the output images of the plurality of past frames after parallel motion and the progressive image, and output the pixel values as a current output image.

Further, to achieve the object, another embodiment of the present invention is a computer readable medium having an image processing program causing an image processing apparatus to execute an image processing, comprising: a conversion processing which converts an input interlaced image into a progressive image by a conversion unit; a detection processing which detects—whether the interlaced image is a slowly vertically scrolled image or not; and a filter processing which, upon detection of the slowly vertically scrolled image, calculates average motion amounts according to the speed of vertical scrolling of the interlaced image, cause parallel motion of an immediately preceding output image stored in a memory unit of the image processing apparatus according to the average motion amount when reading out the immediately preceding output image, calculate cumulative pixel values using the immediately preceding output image after parallel motion and the progressive image as a recursive filter in a time direction, and output the pixel values as a current output image.

By each embodiments of the present invention, an image processing apparatus can be provided which reduces or removes interlace interference occurring when an image with numerous horizontal lines in particular is slowly scrolled vertically, an image processing method, and a computer readable medium having an image processing program.

BRIEF DESCRIPTION OF THE DRAWINGS

FIGS. 3A and 3B are diagrams used to explain lines for processing and average area;

DESCRIPTION OF THE PREFERRED EMBODIMENTS

Figure 1:
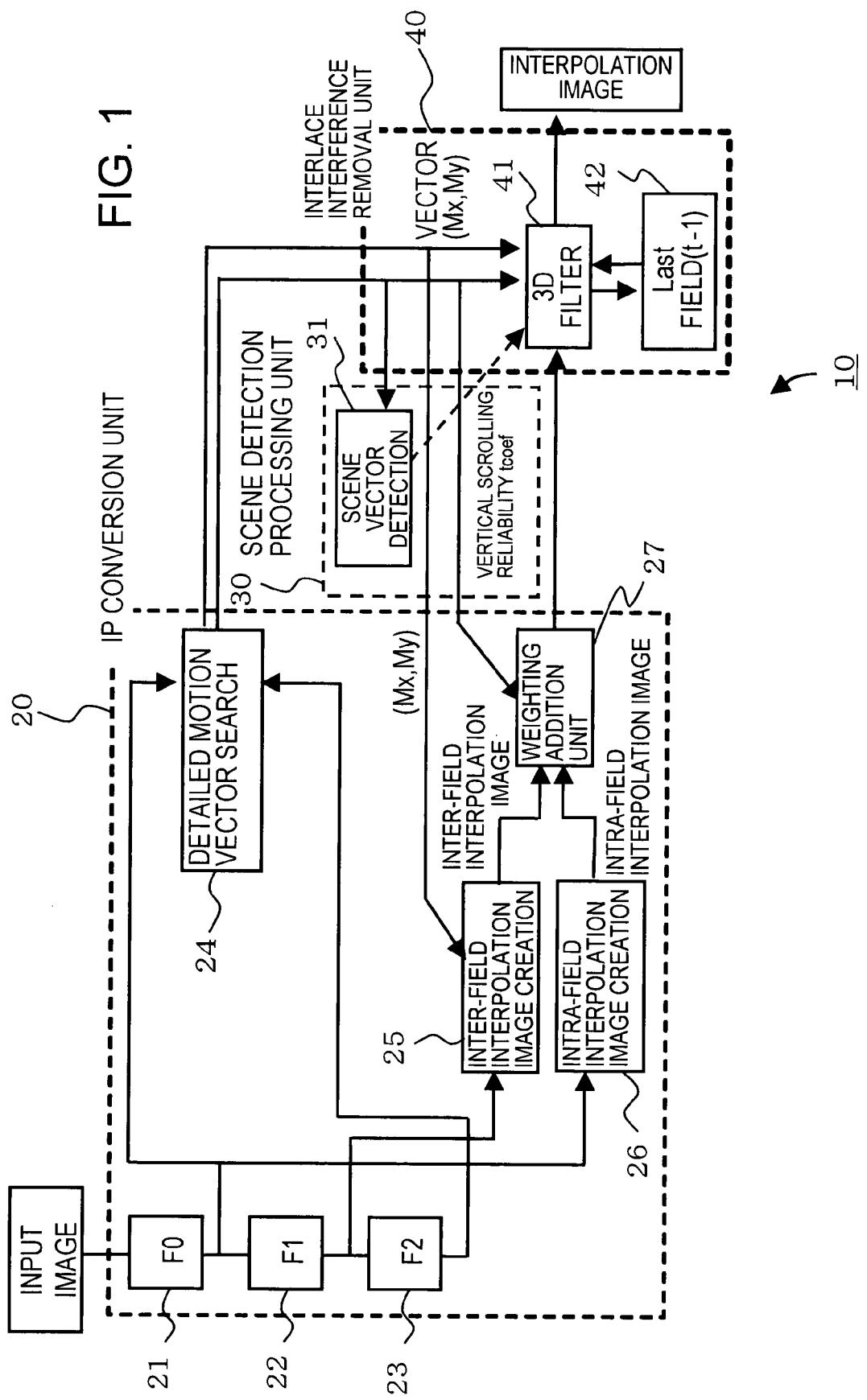
FIG. 1 shows an example of the configuration of an image processing apparatus to which the invention is applied.

Below, preferred embodiments to implement the invention are explained, referring to the drawings.

FIG. 1 shows an example of the configuration of an image processing apparatus to which the invention is applied. The image processing apparatus 10 has an IP conversion unit 20, a scene detection processing unit 30, and an interlace interference removal unit 40.

The IP conversion unit 20 converts the input image, which is an interlaced image, into a progressive (non-interlaced) image. As shown in FIG. 1, the IP conversion unit 20 has first through third field memories 21 to 23, a motion vector detection unit (detailed motion vector search unit) 24, inter-field interpolation image creation unit 25, intra-field interpolation image creation unit 26, and weighting addition unit 27.

The first through third field memories 21 to 23 store the input image in successive field units.

The motion vector detection unit 24 reads the input images F0, F2 (the current input image F0 and the input image F2 for the preceding two fields) from the first and third field memory 21 and 23, and detects motion vectors (Mx,My). For example, motion vectors (Mx,My) are detected from the differences in the two input images F0, F2.

The inter-field interpolation image creation unit 25 reads the input image F1 from the second field memory 22, and based on the motion vectors (Mx,My), interpolates horizontal lines of the input image F1, and creates an inter-field interpolated image (progressive image).

The intra-field interpolation image creation unit 26 reads the input image F0 from the first field memory 21, adds pixel values for adjacent horizontal lines and takes ½ the result to interpolate horizontal lines, and creates an intra-field interpolated image (progressive image).

The weighting addition unit 27 outputs the inter-field interpolation image, if the motion vectors (Mx,My) are within the expected range, according to the reliability of the motion vectors (Mx,My). The weighting additional unit 27 outputs the intra-field interpolation image, if the motion vectors (Mx, My) are outside the expected range, and moreover there is no corresponding past input image.

In this way, a progressive image, obtained either by inter-field or by intra-field interpolation, is output from the IP conversion unit 20.

The scene detection processing unit 30 has a scene vector detection unit 31. The scene vector detection unit 31 outputs coefficients tcoef indicating the reliability (probability) of vertical scrolling of the input image, based on the motion vectors (Mx,My). The scene detection processing unit 30 (scene vector detection unit 31) detects slow and stable vertically-scrolling scenes in the entire screen which are likely to cause interlace interference. Processing details are described below.

The interlace interference removal unit 40 has a 3D (three-dimensional) filter 41 and a field memory 42.

The 3D filter 41 performs time-filter processing directed in motion vector directions in order to prevent interlace interference in the interpolated progressive image. A filter-processed interpolated image is output from the 3D filter 41. Details of the processing are described below.

The field memory 42 stores computation results (an output image) subjected to 3D filter processing, and stores the result for filter processing of the next frame. The field memory 42 may has a plurality of memories; in this case, past processed output images are stored in each field memory 42.

Next, processing details are explained. First, vertical scroll detection processing by the scene detection processing unit 30 is explained; then, filter processing by the 3D filter 41 is explained.

(1) Vertical Scroll Detection Processing by the Scene Detection Processing Unit 30

The details of processing by the scene detection processing unit 30 (scene vector detection unit 31) are explained, referring to FIG. 2.

Figure 2A:
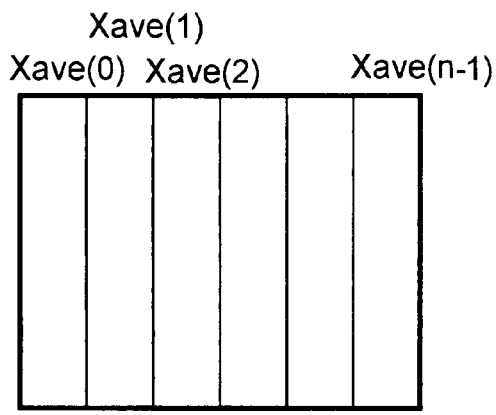
FIGS. 2A and 2B show examples of division regions.
Figure 2B:
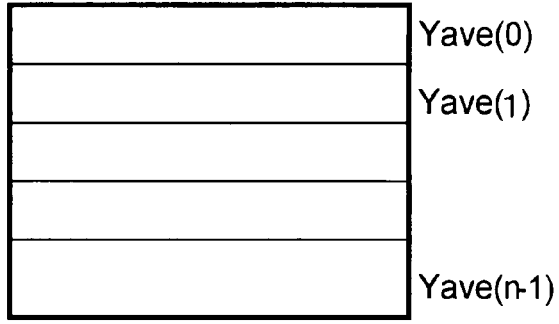
Figure 2C:
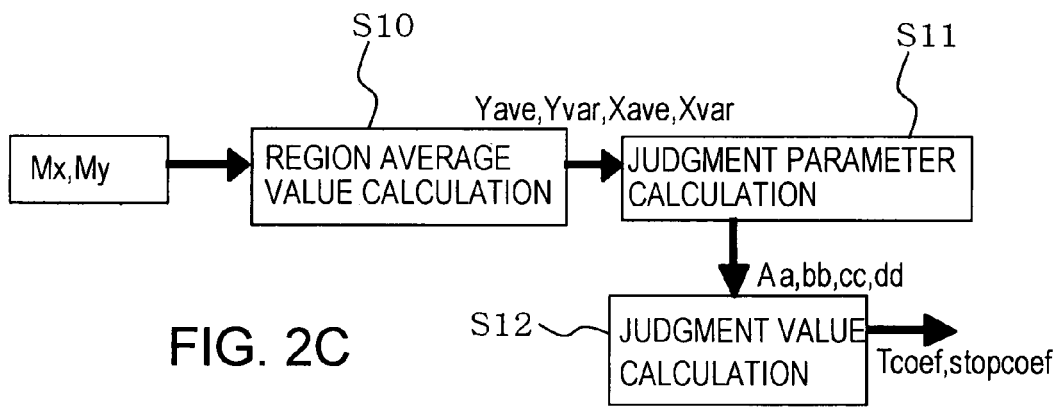
FIG. 2C shows the flow of processing in the scene case by processing unit.

FIG. 2A and FIG. 2B show examples of division regions for the input image, and FIG. 2C shows the flow of processing in the scene detection processing unit 30.

First, the scene vector detection unit 31 divides the input image into prescribed regions, for the division regions calculates the average values of the components Mx and My of motion vectors (Mx,My), and calculates the statistic values (S10).

Division regions are the result of division into a number of divisions XSNUM in the vertical direction (FIG. 2A) and division into a number of divisions YSNUM in the horizontal direction (FIG. 2B). For example, XSNUM=YSNUM=15. The width of the region divided in the vertical direction (the width of vertical stripe regions) is Ww, and the width of the region divided in the horizontal direction (the width of horizontal stripe regions) is Wh.

Then, in the division regions divided in the vertical direction (FIG. 2A), the average value statistic for the component Mx in the x direction of the motion vectors (Mx,My) is calculated. Also, the average value statistic for the component My in the y direction of motion vectors (Mx,My) is calculated for division regions divided in the horizontal direction (FIG. 2B).

First, the average and statistic values for the y-direction component My is explained. The cumulative value Ysum(n) of motion vectors My in the nth division region is obtained from $$Ysum(n) = \sum_{i=0,,Ww/8; j=0,Wh/8} My(t, 8i+4, n*Wh+8j+4) \quad \text{[equation 1]}$$

As indicated in equation (1), instead of performing calculations using all of the motion vectors My in the region, in order to reduce the quantity of calculations, calculations are performed using the motion vectors My at every eight pixels. Of course, the motion vectors may be used at every four pixels, or at every 16 pixels, or similarly.

The average motion amount Yave in the y direction for an entire one field is obtained as follows, using equation (1).

$$Yave = \sum_{i=1,,XSNUM-2} Ysum(i)/XSNUM-2 \quad \text{[equation 2]}$$

The variance Yvar of the y-direction motion amount can be calculated from the difference in adjacent cumulative values Ysum in the vertical direction in the division region, using the following formula.

$$Yvar = \sum_{k=2,,YSNUM-2} |Ysum(k) - Ysum(k-1)| \quad \text{[equation 3]}$$

Similarly, the average value Xsum(n) within each division region in the x direction is determined as follows:

$$Xsum(n) = \sum_{i=0,,Ww/8; j=0,Wh/8} Mx(t, n*Ww+8i+4, 8j+4) \quad \text{[equation 4]}$$

The average motion amount in the x direction Xave is determined as follows:

$$Xave = \sum_{i=1,,YSNUM-2} Xsum(i)/YSNUM-2 \quad \text{[equation 5]}$$

And, the variance Xvar in the x-direction motion amount is determined using $$Xvar = \sum_{k=2,,XSNUM-2} |Xsum(k) - Xsum(k-1)| \quad \text{[equation 6]}$$

The scene detection processing unit 30 calculates judgment parameters from the statistical quantities Yvar, Yave, Xvar, Xave determined in this way (S11). There are three judgment parameters, which are AA, BB, and DD.

AA represents a coefficient (the vertical-scroll y-direction judgment halting coefficient) used to indicate the extent to which the input image has moved in the y direction. The y-direction judgment halting coefficient AA is determined from the y-direction average motion amount Yave (equation (2)). The following equation is used.

$$AA=\max(0,\min(256,(abs(Yave-aa\_\text{off})*aa\_coef/16)) \quad \text{[equation 7]}$$

In equation (7), "aa_off" and "aa_coef" are coefficients used to smoothly change the manner in which the value of the y-direction judgment halting coefficient AA changes. The larger the value of the y-direction judgment halting coefficient AA, the larger is the motion amount in the y direction of the input image.

BB is a coefficient (y-direction variance coefficient) used to judge whether the division regions of the input image move together in the y direction. The y-direction variance coefficient BB will be used in the following equation, employing the variance Yvar of the y-direction motion amount (equation (3)).

$$BB=\max(0,\min(256,(bb\_\text{off}-Yvar)*bb\_coef/16)) \quad \text{[equation 8]}$$

In this case also, "bb_off" and "bb_coef" are coefficients used to smoothly change the y-direction variance coefficient BB. The y-direction variance coefficient BB can take low values when there is coordinated vertical scrolling overall.

DD is a coefficient (x-direction halting coefficient) indicating how much the input image moved in the x direction. The x-direction halting coefficient DD can take on small values when the motion amount in the x direction is small. The value of DD can be obtained from the following equation using the x-direction average motion amount Xave.

$$DD=\max(0,\min(256,(dd\_\text{off}-abs(Xave))*dd\_coef/16)) \quad \text{[equation 9]}$$

The scene detection processing unit 30 uses the coefficients AA, BB and DD obtained in this way to calculate the coefficient tcoef indicating the reliability of vertical scrolling (S12). The following equation is used (AA and other coefficients appear in lowercase).

$$tcoef=aa*bb/256*dd/256 \quad \text{[equation 10]}$$

When the motion amount in the y direction relative to the input image is large (when the value of aa is large), the variance in the y direction is small (the value of bb is small), and the motion amount in the x direction is small (the value of dd is small), then the overall input image is smoothly being scrolled vertically, and as a result the value of the coefficient tcoef is large.

In equation (10), $$tcoef=AA*BB/256*DD/256$$

as explained above, AA is a y-direction motion amount judgment coefficient, BB is a calculated value of the y-direction variance, and DD is a calculated value of the x-direction halting coefficient. AA can take on values from 0 to 256, according to whether the average motion amount in the vertical direction (Y direction) is a constant value or greater within the screen. That is, when the average mount amount in the vertical direction is 0, the value of AA is also 0, and when the average motion amount in the vertical direction is equal to or greater than a prescribed value, the value of AA rapidly approaches 256.

BB is a value indicating that the variance of vertical-direction motion vectors within the screen is equal to or less than a constant value; when the variance is small, the value becomes 256, and when the variance is large the value becomes 0.

DD is a constant used to judge whether the absolute magnitude of the motion amount in the horizontal direction (X direction) is less than or equal to a constant value. If the magnitude of the motion amount in the horizontal direction is 0, then the value of DD is 256; if the horizontal-direction motion amount is equal to or greater than a prescribed value, the value of DD rapidly approaches 0. The value of DD is set in the range 0 to 256 in order to perform calculations using a fixed decimal place; floating-point calculations using values between 0 and 1.0 may also be performed.

As explained above, the scene detection processing unit 30 outputs the vertical scrolling coefficient tcoef, and based on the value of tcoef detects slow vertically-scrolling scenes which tend to cause interlace interference.

When the value of tcoef is 0 vertical scrolling is judged not to be occurring, and when the value is 256 vertical scrolling is judged to be occurring. For intermediate values between 0 and 256, there is a smooth change depending on the values of AA, BB, and DD above, Hence by using tcoef to configure a 3D filter during vertical scrolling, interlace interference removal processing operates smoothly during vertical scrolling, so that processing resulting in little sense of incompatibility is possible.

(2) Filter Processing by the 3D Filter 41

Figure 4:
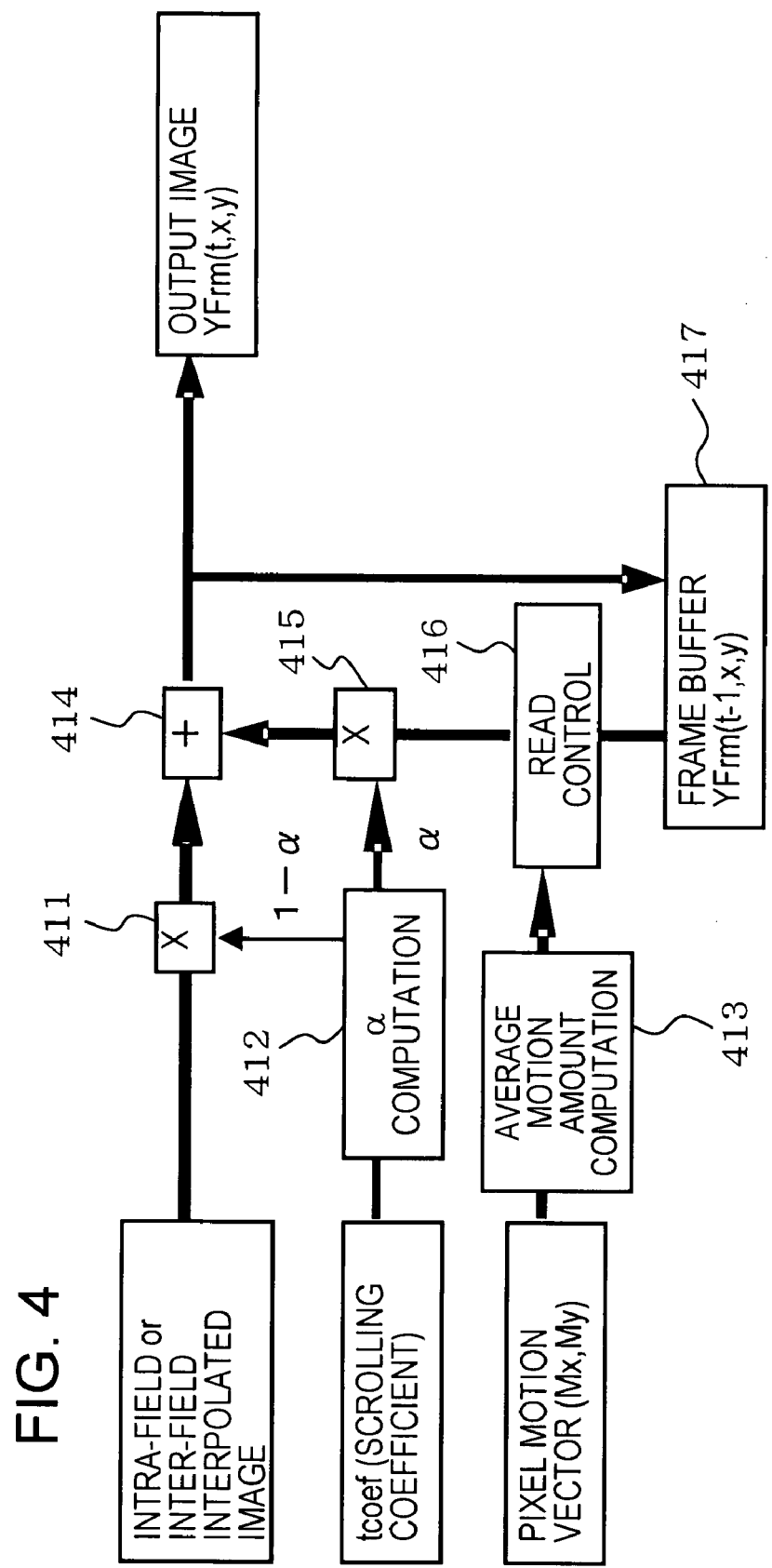
FIG. 4 shows an example of the configuration of a 3D filter.
Figure 5:
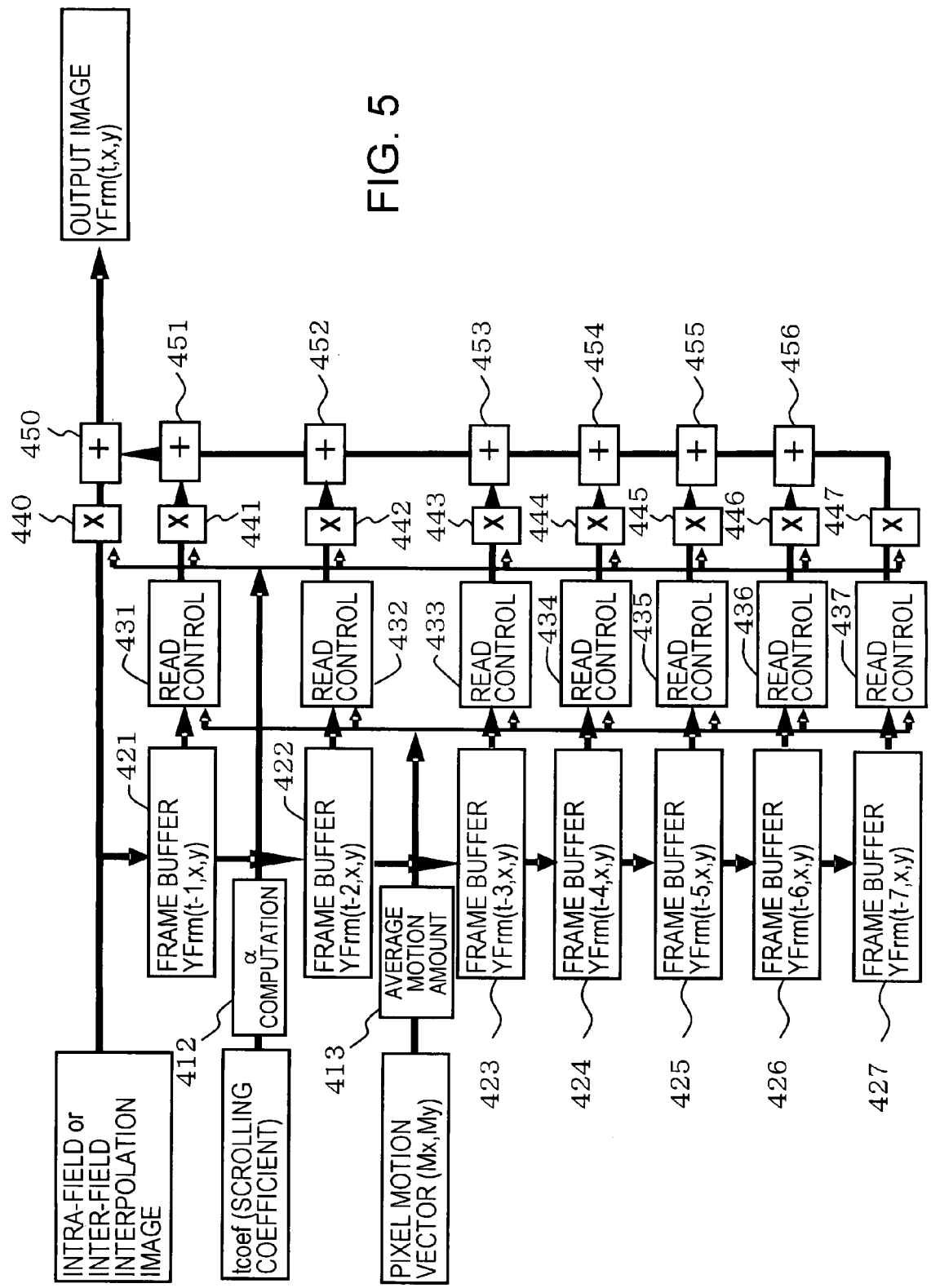
FIG. 5 shows an example of the configuration of a 3D filter.

Next, 3D filter processing in the 3D filter 41 of the interlace interference removal unit 40 is explained, referring to FIG. 3 through FIG. 5. 3D filter processing is filter processing of the progressive image after interpolation, performed in the motion vector direction. The average vector and vertical scrolling coefficient tcoef are used as processing parameters.

The average vector is explained. The motion vector (Mx, My) is input to the 3D filter 41 from the motion vector detection unit 24 of the IP conversion unit 20. First, the average vectors Vx_ave(t,y), Vy_ave(t,y) within each line of the x and y components of the motion vectors (Mx,My) are calculated. The following respective equations are used.

$$Vx\_ave(t, y) = \frac{\sum_{i=0, width-1} Mx(t, x+i, y)}{width} \quad [\text{equation 11}]$$

$$Vy\_ave(t, y) = \frac{\sum_{i=0, width-1} My(t, x+i, y)}{width} \quad [\text{equation 12}]$$

Here, "t" indicates time, and "width" indicates the width in the horizontal direction (x direction) of one frame of the progressive image.

Then, the average vectors V'x(t,y), V'y(t,y) are calculated from the average vectors within lines Vx_ave(t,y), Vy_ave(t,y). The following respective equations are used.

$$V'x(t, y) = \frac{\sum_{j=1, VYLINE} Vx\_ave(t, y-j)}{VYLEN} \quad [\text{equation 13}]$$

$$V'y(t, y) = \frac{\sum_{j=1, VYLINE} Vy\_ave(t, y-j)}{VYLEN} \quad [\text{equation 14}]$$

FIG. 3A and FIG. 3B are conceptual diagrams showing a method of determining average vectors. As shown in FIG. 3B, first the average vectors within lines Vx_ave(t,y) and Vy_ave(t,y) are calculated for processing line in an image at time (t), and the averages of the average vectors within lines are determined for the immediately preceding number of lines VYLEN, to calculate the average vectors V'x(t,y), V'y(t,y). For example, VYLEN may be 48. These average vectors V'x(t,y) V'y(t,y) indicate the average motion amounts of pixels within a region of VYLEN lines.

Ordinarily, the motion vectors (Mx,My) would be used without modification, and would be subjected to filter processing as motion amounts; but there are cases in which horizontal-direction vectors are detected in edge regions during vertical scrolling, and if filter processing is performed without modification, interlace interference in edge regions cannot be prevented, and so the above-described average vectors (average motion amounts) V'x(t,y), V'y(t,y) are calculated.

When determining these average vectors, a preparation area is provided, as shown in FIG. 3B. Into this preparation area are inserted average vectors for 0 to VYLEN lines of the image area in the progressive image for time (t−1). In the image at time (t), when the average area exceeds the 0th line of the image area, the average vector values of this preparation area are used to calculate the average vectors V'x(t,y), V'y(t,y). By using the values for the preparation area, the average vectors V'x(t,y), V'y (t,y) can be changed smoothly, and proper filter processing can be performed extending over the entire image.

Then, these average vectors (average motion amounts) V'x(t,y), V'y(t,y) and the vertical scrolling coefficient tcoef are used to perform 3D filter processing.

Details of the filter processing in the 3D filter 41 are explained. With respect to filter processing in this embodiment, processing can be performed by an IIR (Infinite Impulse Response) type filter, or by an FIR (Finite Impulse Response) type filter. Each of these two types of processing is explained.

(2-1) IIR Type Filter

FIG. 4 shows the block configuration of the 3D filter 41. The 3D filter 41 has a first multiplier 411, α computation unit 412, average motion amount computation unit 413, first adder 414, second adder 415, read control unit 416, and frame buffer 417 (corresponding to the field memory 42 of FIG. 1).

The α computation unit 412 computes the time constant α used in filter processing from the vertical scrolling coefficient tcoef. The following equation is used.

$$\alpha = tcoef*tflt\_max/256 \quad [\text{equation 15}]$$

Here, "tflt_max" is a maximum filter coefficient, used to keep α in the range from 0 to 1. The α computation unit 412 outputs the computed value of α to the second multiplier 415, and the value (1−α) to the first multiplier 411.

The average motion amount computation unit 413 calculates the average vectors V'x(t,y), V'y(t,y) from the motion vectors (Mx,My), and outputs the result to the read control unit 416.

The read control unit 416 reads the immediately preceding output frame image Frm from the frame buffer 417, but reads pixel value at the pixel coordinate positions offset by the amounts of the average vectors $V^r x(t,y)$, $V^r y(t,y)$ to the immediately preceding output frame image Frm. That is, the read-out output frame image Frm can be expressed as follows.

$$\text{Frm}(t-1, x+V'x(t,y)/2, y+V'y(t,y)/2) \quad \text{[equation 16]}$$

In equation (16), the offset amounts are respectively ½ of the average vectors $V^r x(t,y)$ $V^r y(t,y)$ in order to bring into agreement progressive images (read-out frame images Frm) at 30 frames/second, and non-interlaced images (input images F0, F2 used when calculating average vectors) at 60 fields/second.

The second multiplier 415 multiplies the read-out output frame image Frm and α, and outputs the result. On the other hand, the first multiplier 411 multiplies the current frame image after interpolation Yout(t,x,y) and (1−α), and outputs the result.

The first adder 414 adds the images from the first and second multipliers 411 and 415, to obtain the output image YFrm(t,x,y). Here, the output image YFrm(t,x,y) is represented by $$YFrm(t,x,y) = \min(\max(\alpha \cdot Frm(t-1, x+V'x(t,y)/2, y+V'y(t,y)/2) + (1-a) \cdot Yout(t,x,y)/256, 0), 225 \quad \text{[equation 17]}$$

Through a blend operation of the output image Yout(t,x,y) with the ratio α, 3D filter processing is performed with α as a time constant.

As indicated in equation (17), when the vertical scrolling coefficient tcoef is 0, that is, when vertical scrolling is not detected, the immediately preceding frame stored in the frame buffer 417 is output without modification as the output image YFrm(t,x,y). In equation (17), min() and max() are provided to keep the (pixel values of the) output image YFrm (t,x,y) within the range from 0 to 255.

In this way, when in IIR type filter processing the stable vertical scrolling scene is detected by the scene detection processing unit 30, the past frame image Frm(t−1,x,y) is parallel-moved according to the motion amount (average vectors $V^r x(t,y)$, $V^r y(t,y)$) according to the motion vector (Mx, My) which indicates the vertical scrolling speed, cumulative pixel values are calculated using the pixel values and (pixel values of) the interpolated image Yout(t,x,y), and the pixel values YFrm(t,x,y) are used as the output image.

However, when calculating cumulative pixel values, a recursive filter is configured which filters in the time direction, and by this means the (pixel values of the) output image YFrm(t,x,y) is obtained.

Focusing on the (pixel values of the) interpolated image Yout(t,x,y) output from the IP conversion unit 20, during vertical scrolling, the pixel values change significantly as time passes. However, because filter processing is performed only in the time direction, the output image YFrm(t,x,y), while following this change, changes smoothly.

Hence by using the 3D filter such as that shown in FIG. 4 on images in which numerous interlace interference occurs, clear and stable vertically-scrolled images which do not result in blurring of the images themselves are obtained, even for images which would otherwise tend to result in substantial interlace interference during slow vertical scrolling.

Figure 6A:
FIG. 6A shows an example of an output image during vertical scrolling after IP conversion of the prior art.
Figure 6B:
FIG. 6B shows an example of an output image after IP conversion by this embodiment.

FIG. 6A shows an example of an output image during vertical scrolling after IP conversion according to the prior art; FIG. 6B shows an example of an output image during vertical scrolling in this embodiment. As seen in FIG. 6B, the output image resulting from this embodiment has little fluctuation of edge portions, and a clear image with interlace interference removed or reduced is obtained.

(2-2) FIR Type Filter

Next, an example is explained in which the 3D filter 41 is configured as a FIR type filter. FIG. 5 is shows the block configuration of the 3D filter 41. Portions which are the same as in FIG. 4 are assigned the same numbers.

The 3D filter 41 has seven frame buffers 421 to 427, which store the past seven frames' worth of images; seven read control units 431 to 437, which control reading from the seven frame buffers 421 to 427 based on average motion amounts (average vectors); eight multipliers 440 to 447, which multiply a time constant α with output images read from the read control units 431 to 437; and seven adders 450 to 456 which add the output images from the multipliers 440 to 447.

Similarly to the example of FIG. 4, the filter processing time constant α is calculated by the α computation unit 412, and is output to each of the multipliers 440 to 447. The average motion amount is also calculated by the average motion amount computation unit 413. The α computation unit 412 computes and outputs (1−α) and also α/N (where N is the number of frame buffers).

The output image YFrm(t,x,y) in the example of FIG. 5 is expressed using the following equation.

$$YFrm(t, x, y) = \min\left(\max\left((1-\alpha) \cdot Frm(t, x, y) + \alpha \cdot \frac{\sum_{i=0,1,\ldots,N-1} Frm(t-i, x+V^t x(t-i, y) * i/2, y+V^t y(t-i, y) * i/2)}{N}, 0\right), 255\right) \quad \text{[equation 18]}$$

Here, $V^t x$, $V^t y$ represent average motion vector amounts calculated from motion amounts within the screen, and Frm (t,x,y) represents the IP converted input image data at the time t.

Based on average motion amounts, frame images processed in the past are read from the frame buffers 421 to 427. In this case also, frame images which have undergone parallel motion using average vectors are read. Then, the read-out frame images and the time constant α are multiplied by the respective multipliers 440 to 447, the results are added by the adders 450 to 456, and cumulative pixel values are obtained. The cumulative (pixel values of the) output image Yform(t, x,y) are used as the output image during vertical scrolling.

When using this FIR type filter also, upon detecting the stable vertically scrolling scene in the scene detection processing unit 30, each of the plurality of past frame images Frm(t−i,x,y) are parallel-moved only motion amounts (average vectors $V^r x(t,y)$, $V^r y(t,y)$), in accordance with motion vectors (Mx,My) which indicate the vertical scrolling speed, the cumulative pixel values are calculated, and the pixel values YFrm(t,x,y) are taken to be the output image during vertical scrolling.

In this case also, the (pixel values of the) interpolated image Yout(t,x,y) is such that pixel values change substantially in the time direction during vertical scrolling, but by performing filter processing using time motion averages, the output images YFrm(t,x,y), while tracking the changes, change smoothly.

Hence clear and stable vertical-scrolling images can be obtained in which interlace interference which occurs during slow vertical scrolling is removed, without blurring of the images themselves. For example, the vertically-scrolled image such as that shown in FIG. 6B can be obtained.

A FIR type filter was explained for a case in which the number of frame buffers 421 to 427 and similar is seven. Of course this is only one example, and two, or three, or a different number may be used, so long as output images YFrm(t,x,y) with interlace interference removed or similar are obtained.

Compared with the above-described IIR type filter, this FIR type filter (FIG. 5) calculates cumulative pixel values after parallel motion over the plurality of past frames, whereas the IIR type filter (FIG. 4) performs calculations by means of the recursive filter using the immediately preceding frame. Hence the filter 41 configured as the IIR type filter can reduce the number of the frame buffers 421 to 427.

The image processing apparatus 1 explained in this embodiment is suitable for use in for example liquid crystal televisions, plasma televisions, information equipment having liquid crystal displays (for example, personal computers, portable phones, PDAs (Personal Digital Assistants), and similar).

What is claimed is:

1. An image processing apparatus, comprising:
   an IP conversion unit which converts an input interlaced image into a progressive image based on first and second field images of the interlaced image respectively stored in first and second field memories, by interpolating the second field image based on a difference between the first and second field images;
   a scene detection unit which detects whether the interlaced image is a vertically scrolled image based on a vertical component of a motion vector calculated using the difference between the first and second field images; and
   a filter processing unit which, when the vertically scrolled image is detected by the scene detection unit, calculates average motion amounts according to a speed of vertical scrolling of the interlaced image, causes parallel motion of each of output images of a plurality of past frames by reading from a buffer memory a plurality of pixel values in pixel positions of the progressive image offset by the average motion amounts, calculates cumulative pixel values from the output images of the plurality of past frames after parallel motion and the progressive image, and outputs the pixel values as a current output image.

2. The image processing apparatus according to claim 1, wherein
   the IP conversion unit comprises a motion vector detection unit which detects motion vectors in the interlaced image; and
   the scene detection unit detects the interlaced image as the vertically scrolled image, when detects, based on the motion vectors, that the motion amount in the vertical direction of scrolling of the vertically scrolled image is large than a first threshold value, that the vertically scrolled image moves as a whole in the vertical direction, and that the motion amount in the horizontal direction of the vertically scrolled image is small than a second threshold value.

3. The image processing apparatus according to claim 1, wherein the filter processing unit calculates the average motion amounts from averages of the motion vectors detected by the IP conversion unit.

4. The image processing apparatus according to claim 3, wherein the filter processing unit calculates the average motion amounts from the motion vectors for a plurality of lines of the interlaced image, inserts into a preparation area the average motion amounts for the plurality of lines from the uppermost line of the image area of an immediately preceding interlaced image, and when calculating the average motion amounts of a current progressive image, uses the average movement amounts inserted into the preparation area to perform calculations in a case where the plurality of lines exceeds the uppermost line of the image area of the interlaced image.

5. The image processing apparatus according to claim 1, wherein the filter processing unit causes the parallel motion of each of the output images of the plurality past frames through offset by the average motion amounts, reads pixel values of pixels in the offset positions, and calculates the cumulative pixel values.

6. The image processing apparatus according to claim 1, wherein the filter processing unit multiplies the output images of the plurality of past frames after the parallel motion and the progressive image by a ratio based on detection results detected by the scene detection unit, and calculates the cumulative pixel values using the multiplied pixel values of the respective images.

7. An image processing apparatus, comprising:
   an IP conversion unit which converts an input interlaced image into a progressive image based on first and second field images of the interlaced image respectively stored in first and second field memories, by interpolating the second field image based on a difference between the first and second field images;
   a scene detection unit which detects whether the interlaced image is a vertically scrolled image based on a vertical component of a motion vector calculated using the difference between the first and second field images; and
   a filter processing unit which, if the vertically scrolled image is detected by the scene detection unit, calculates an average motion amount according to the speed of vertical scrolling of the interlaced image, causes parallel motion of an immediately preceding output image by reading from a buffer memory a plurality of pixel values in pixel positions of the progressive image offset by the average motion amounts, calculates cumulative pixel values from the immediately preceding output image after parallel motion and the progressive image as a recursive filter in a time direction, and outputs the pixel values as a current output image.

8. The image processing apparatus according to claim 7, wherein the filter processing unit causes the parallel motion of the immediately preceding output image through offset by the average motion amounts, reads pixel values of pixels in the offset positions, and calculates the cumulative pixel values.

9. The image processing apparatus according to claim 7, wherein the filter processing unit multiplies the immediately preceding output image after the parallel motion and the progressive image by a ratio based on the detection result detected by the scene detection unit, using blend computation, and calculates the cumulative pixel values using the multiplied pixel values of the respective images.

10. The image processing apparatus according to claim 7, wherein
    the IP conversion unit comprises a motion vector detection unit which detects motion vectors in the interlaced image; and
    the scene detection unit detects the interlaced image as the vertically scrolled image, when detects, based on the motion vectors, that the motion amount in the vertical direction of scrolling of the vertically scrolled image is large than a first threshold value, that the vertically scrolled image moves as a whole in the vertical direction, and that the motion amount in the horizontal direction of the vertically scrolled image is small than a second threshold value.

11. The image processing apparatus according to claim 7, wherein the filter processing unit calculates the average motion amounts from averages of the motion vectors detected by the IP conversion unit.

12. The image processing apparatus according to claim 7, wherein the filter processing unit calculates the average motion amounts from the motion vectors for a plurality of lines of the interlaced image, inserts into a preparation area the average motion amounts for the plurality of lines from the uppermost line of the image area of an immediately preceding interlaced image, and when calculating the average motion amounts of a current progressive image, uses the average movement amounts inserted into the preparation area to perform calculations in a case where the plurality of lines exceeds the uppermost line of the image area of the interlaced image.

13. An image processing method in an image processing apparatus, comprising the steps of:
    converting an input interlaced image into a progressive image by a conversion unit;
    detecting that the interlaced image is a vertically scrolled image or not; and
    calculating average motion amounts according to the speed of vertical scrolling of the interlaced image, causing parallel motion of each of output images of a plurality of past frames according to the average movement amounts, calculating cumulative pixel values using the output images of the plurality of past frames after parallel motion and the progressive image, and outputting the pixel values as a current output image, on detection of the vertically scrolled image.

14. An image processing method in an image processing apparatus, comprising the steps of:
    converting an input interlaced image into a progressive image by a conversion unit;
    detecting that the interlaced image is a vertically scrolled image or not; and
    calculating average motion amounts according to the speed of vertical scrolling of the interlaced image, causing parallel motion of an immediately preceding output image according to the average motion amount, calculating cumulative pixel values using the immediately preceding output image after parallel motion and the progressive image as a recursive filter in a time direction, and outputting the pixel values as a current output image, upon detection of the vertically scrolled image.

15. A non-transitory computer readable medium including an image processing program causing an image processing apparatus to execute an image processing, comprising:
    a conversion processing which converts an input interlaced image into a progressive image;
    a detection processing which detects whether the interlaced image is a vertically scrolled image or not; and
    a filter processing which, upon detection of the vertically scrolled image, calculates average motion amounts according to the speed of vertical scrolling of the interlaced image, causes parallel motion of each of output images of a plurality of past frames respectively stored in a plurality of memory units according to the average movement amounts when reading out the output images of the plurality of past frames, calculates cumulative pixel values using the output images of the plurality of past frames after parallel motion and the progressive image, and output the pixel values as a current output image.

16. A non-transitory computer readable medium including an image processing program causing an image processing apparatus to execute an image processing, comprising:
    a conversion processing which converts an input interlaced image into a progressive image by a conversion unit;
    a detection processing which detects whether the interlaced image is a vertically scrolled image or not; and
    a filter processing which, upon detection of the vertically scrolled image, calculates average motion amounts according to the speed of vertical scrolling of the interlaced image, cause parallel motion of an immediately preceding output image stored in a memory unit of the image processing apparatus according to the average motion amount when reading out the immediately preceding output image, calculate cumulative pixel values using the immediately preceding output image after parallel motion and the progressive image as a recursive filter in a time direction, and output the pixel values as a current output image.

* * * * *